United States Patent Office 3,512,471
Patented May 19, 1970

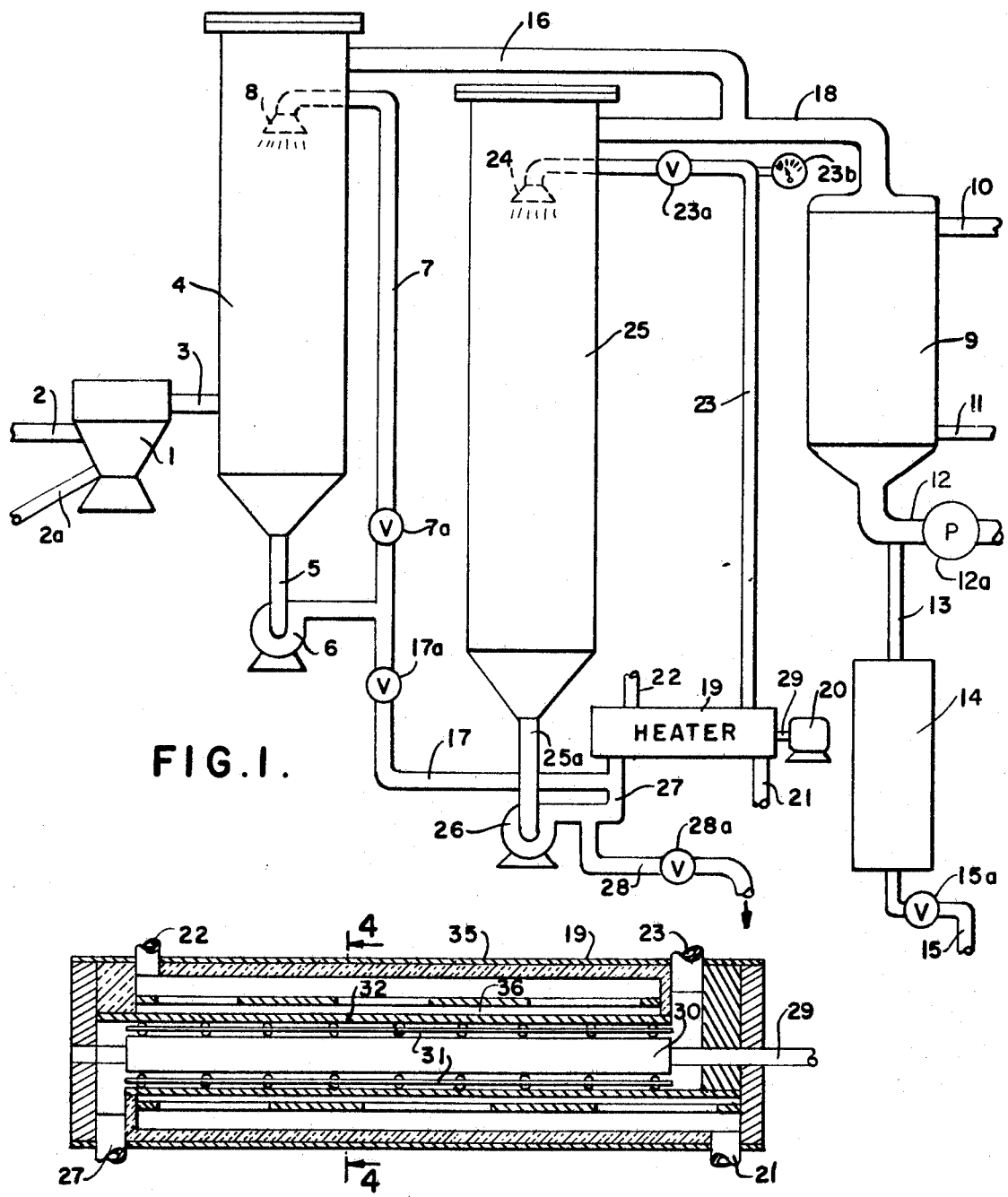
FIG.1.
FIG.3.
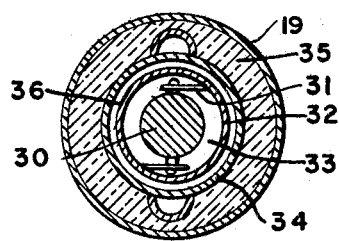
FIG.4.
INVENTOR
Ralph G. Sargeant
BY J. Hanson Boyden
ATTORNEY

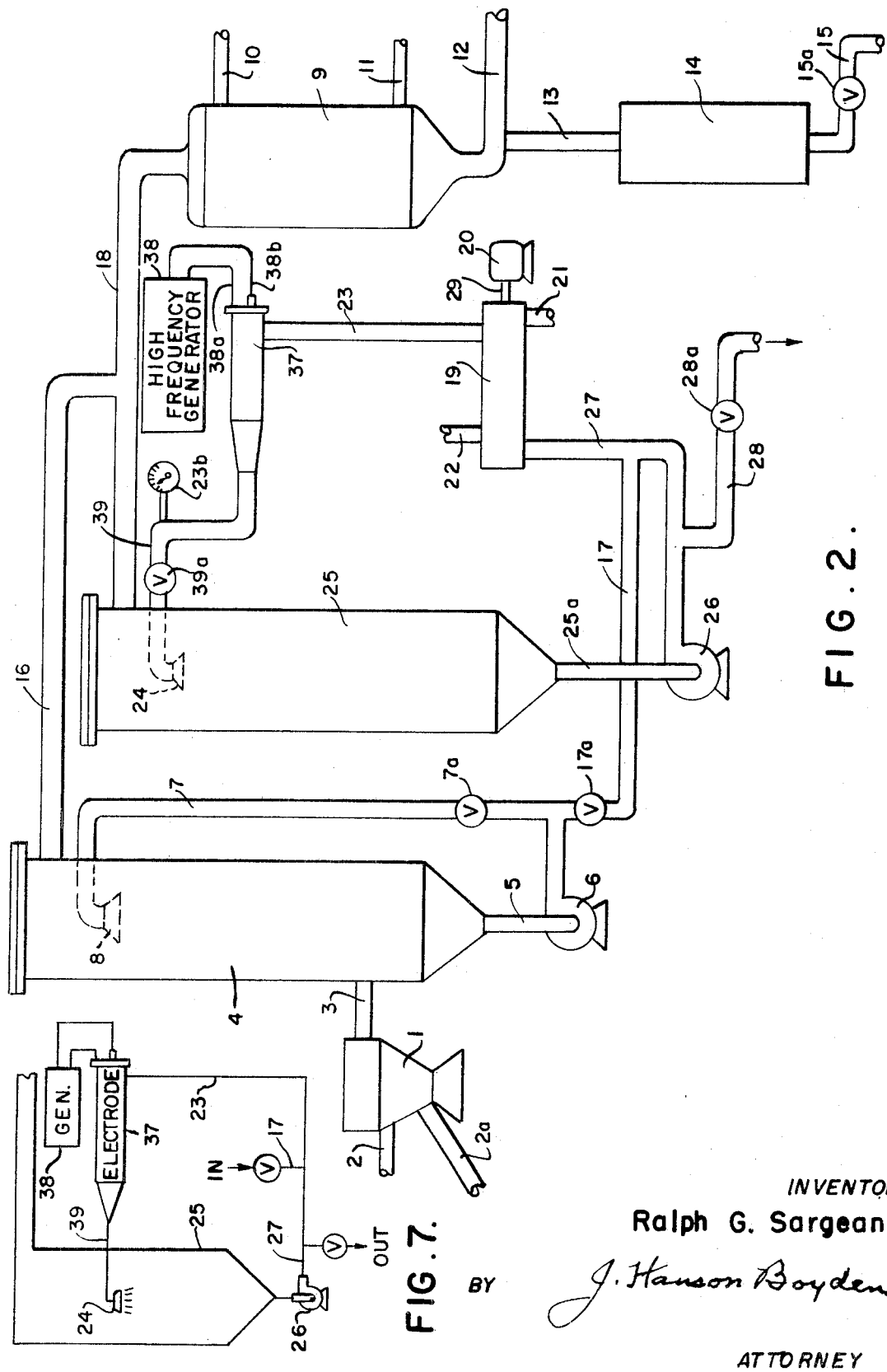

3,512,471
APPARATUS FOR REMOVING WATER BY
EVAPORATION FROM LIQUID MIXTURES
Ralph G. Sargeant, 408 W. Windsor,
Lakeland, Fla. 33803
Original application June 21, 1963, Ser. No. 289,702, now
Patent No. 3,428,463. Divided and this application Sept.
27, 1968, Ser. No. 763,171
Int. Cl. A23b 5/02
U.S. Cl. 99—246                                        6 Claims

ABSTRACT OF THE DISCLOSURE

Uses a heater of the "swept surface" type, and passes the liquid in a confined stream first through this heater and then through a special electrode device where it is subjected to high frequency electrical energy. Discharges the liquid from the swept surface heater into an evaporating chamber. Re-cycles the liquid through a de-aerating chamber to remove air before passing it through the heater. Also provides means for vaporizing fresh fruit juice, causing the vapors to flow through a conduit, and sprays across such conduit relatively cold concentrated juice, whereby the vapors are condensed and absorbed by said concentrated juice.

---

This application is a division of my prior co-pending application Ser. No. 289,702, filed June 21, 1963, now U.S. Pat. No. 3,428,463.

While this invention may be applicable to the treatment of liquid materials in general, it relates especially to the production by evaporation of high density, low viscosity fruit juice concentrates, particularly citrus and apple juice concentrates. Some of these juices tend to jellify or become gummy when heated.

One object of the invention is to provide means for subjecting the juice to mechanical treatment while being heated, so as to break up any jellified or gummy substances which may be present, and to smooth out the liquid and reduce the particle size.

Another object is to utilize a heating means of the so-called "swept surface" type, which is so designed as to positively prevent the juices from sticking to or accumulating on the heating surfaces.

Still another object of the invention is to provide means for de-aerating the juice, especially when taken from cold storage, before it is subjected to the action of the evaporating means, to produce a high density, low viscosity concentrate.

It is desirable to de-aerate the juice to remove any off flavors that the concentrate may have developed during storage. Furthermore, the presence of air tends to oxidize the juice, and also causes the product to be a poorer thermal conductor.

Yet a further object is to devise means for first applying heat to the juices and an additional means for thereafter applying to the heated material high frequency electrical energy, such as radio frequency.

Still another object of the invention is to improve the flavor of a high density, low viscosity fruit juice concentrate by causing such concentrate to absorb esters and flavoring elements given off from fresh juice when the same is heated, or evaporated.

In my prior Pats. Nos. 3,060,297, dated Oct. 23, 1962, and No. 3,072,490, dated Jan. 8, 1963, there is shown apparatus for and a method of producing high density, low viscosity citrus juice concentrate, involving subjecting the juice to the action of radio-frequency electrical energy. In these patents, the juice is circulated by means of a pump from the bottom of a vertical evaporating chamber through a conduit and a high frequency electrical device, and thence through a spray head into the top of the evaporating chamber again. In said patents, the juice to be treated was introduced into the apparatus at a point between the evaporating chamber and the intake side of said pump, and it has been found that, under certain conditions, there is a possibility that a small portion of the juice may reach the outlet without passing through said electrical device.

A further object of the invention therefore is to re-arrange the apparatus so as to insure that this cannot happen. To this end I now prefer to introduce the juice to be treated into the conduit at a point between the electrical device and the discharge side of the pump. Thus, absolutely all of the juice must pass first through said electrical device before reaching the evaporating chamber.

The amount of pulp contained in the juice to be concentrated is rather critical. I have found that 5% to 13% is most desirable. This can sometimes be achieved by the use of an .020 screen on the "finisher," loosely adjusted. An object of the present invention is to provide a new method for controlling the percentage of pulp. This I accomplish by the use of a centrifuge. By varying the speed or controls, the percentage of pulp can be regulated as desired. As set forth in a prior application, the pulp contains a large proportion of the pectin complexes which are present in the juice, and the separation of these complexes is thus very important.

A still further object of the invention is to provide improved means whereby the fresh juice can be subjected to the action of high frequency electrical energy while on its way to the first stage of a conventional steam evaporator, whereby an improved product of lower viscosity is obtained, which, even after having been stored at 0° F., for a substantial period of time, can be further concentrated up to 72° Brix or more, and provides a high density, low viscosity product which is commercially acceptable.

With the above and other objects in view, and to improve generally upon such apparatus, the invention consists in the combination and arrangement of parts hereinafter described and claimed, and illustrated in the accompanying drawings, forming part of this specification, and in which:

FIG. 1 is a diagrammatic view showing one form of my complete apparatus;

FIG. 2 is a similar view showing another form of my complete apparatus;

FIG. 3 is a longitudinal section on an enlarged scale through the "swept surface" type of heater which I employ;

FIG. 4 is a transverse section substantially on the line 4—4 of FIG. 3;

FIG. 7 is a diagram showing a preferred method of feeding liquid in and out of my improved apparatus, where no de-aerating chamber is employed.

Figure 5:
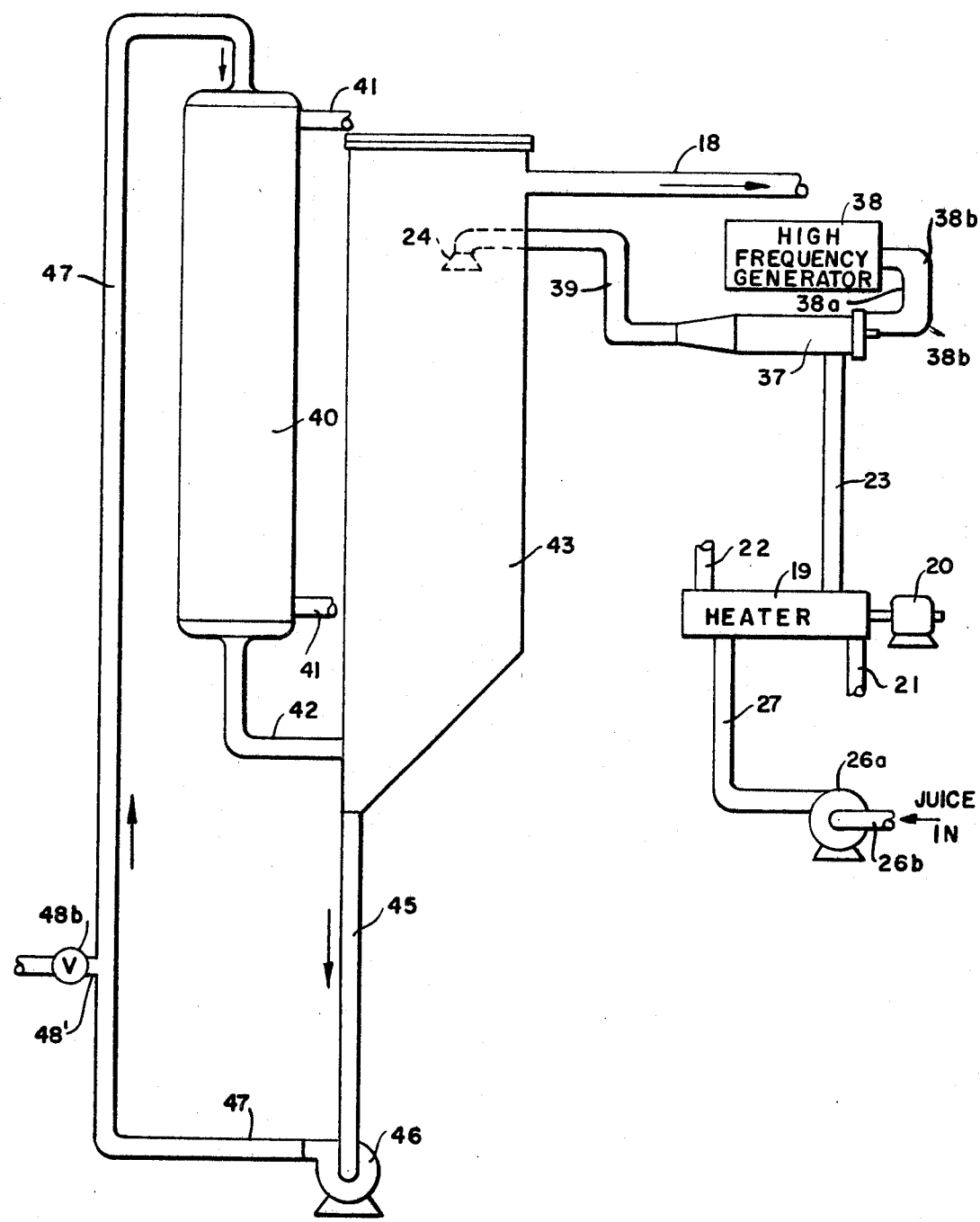
FIG. 5 is a schematic view showing the application of high frequency energy to fresh juice on its way to the first stage of a conventional steam evaporator.

While, in its broader aspects, the invention is applicable to various kinds of fruit juices, and other liquids containing water, it has special utility when used for the preparation of high density, low viscosity citrus juice concentrates, such as orange juice, and it will be described in detail, by way of example, in connection with the treatment of citrus juices.

Referring to the drawings in detail, and more particularly first to FIG. 1, a centrifuge is shown at 1, as in my said prior patents. The juice to be treated is delivered from the "finisher" through pipe 2, and is separated by the centrifuge into two portions, one which I shall designate as the water-containing portion, and the other the ester-carrying portion. This latter contains the major portion of the pulp and pectin complexes, while the watery portion contains most of the sugars and acids.

The water-containing portion is delivered through a pipe 3 to a vertically disposed, elongated de-aerating chamber 4. From the bottom of this chamber extends a pipe 5 to a centrifugal pump 6, from the discharge side of which extends a pipe 7 which enters the chamber 4 at a point near the top, where it terminates in a spray head 8. Thus, the watery juice is recycled by the pump 6 through the pipe 7 and spray head 8, from which it falls to the bottom of the chamber. Meanwhile, the de-aerating chamber is maintained under a partial vacuum by means of a conduit 16, which, through a conduit 18 and condenser 9, communicates with a pipe 12 connected with any suitable type of vacuum pump (not shown). Thus, any air contained in the juice is effectively removed.

From the discharge side of the pump 6 extends another pipe 17, which, through a third pipe 27, connects with a heating device 19, the construction of which will be hereinafter described in detail. A heating medium, such as steam or hot water, is supplied through pipes 21 and 22, and the heater includes a shaft 29, driven by a motor 20. From the heater 19 extends a pipe 23 into the upper end of a vertical, elongated evaporating chamber 25, where it terminates in a spray head 24. As in my said prior patents, this chamber is preferably jacketed. From the bottom of this evaporating chamber 25 extends a pipe 25a to a centrifugal pump 26, which delivers into a pipe 28, connected with the pipe 27. Valves 7a, 17a, 23a and 28a are interposed in the pipes 7, 17, 23 and 28, respectively, to control the flow of liquid therethrough, and a pressure gauge 23b is preferably mounted on the pipe 23.

From the top of the evaporating chamber 25 extends a conduit 18 to a condenser 9, a cooling medium being supplied through pipes 10 and 11. From the vacuum pump pipe 12 at the bottom of the condenser extends a pipe 13 to a condensate receptacle 14, from which the condensate may be drawn off through a discharge pipe 15, controlled by a valve 15a.

With valve 7a open and valve 17a closed, the pump 6 continues to recycle the juice through the de-aerating chamber until all of the contained air is completely removed. Then, when valve 17a is opened, the pump 6 forces the juice from the de-aerating chamber through pipe 17 to pipe 27, where it joins the juice being concentrated and recycled by the pump 26 through the evaporating chamber 25. This latter pump forces the juice through the heater 19 and pipe 23 to the spray head 24, when the valve 23a is open. The concentrated juice may be withdrawn from the pipe 28.

It will be noted that the juice is forced through the heater under substantial hydraulic pressure. By way of example, I have successfully used pressures of from 10 to 40 or more pounds per square inch.

It will be further noted that the juice taken from the de-aerating chamber and then recycled through the evaporating chamber passes in series through and is subjected to the operation of both positive displacement pumps 6 and 26. This causes the juice and pulp particles to be acted upon by mechanical force, which has a beneficial effect on the product.

The heater 19 is of a very special kind known as the "swept surface" type. As shown in FIGS. 3 and 4, it comprises a cylindrical casing or housing through the center of which extends a cylindrical drum 30, supported on a shaft 29. Surrounding this drum and separated therefrom by an annular space 33 is a cylinder 32. Mounted on the surface of the drum 30 are a pair of diametrically disposed scraper blades 31 extending the length of the cylinder 32 and having free edges adapted to engage and sweep over the inner surface of this cylinder as the shaft 29 is driven by the motor 20.

Surrounding the cylinder 32 and separated from it by a space 36 is another cylindrical casing 34, this second cylinder being covered by suitable insulating material 35, the latter being enclosed by a metal shell. The juice being treated circulates through the annular space 33, from end to end, by means of the pipes 27 and 23, while a suitable heating medium is supplied through pipes 21 and 22, and flows from end to end through the space 36, in contact with the outside of the metal cylinder 32, thus heating the same. Either steam or hot water may be used, but I prefer hot water. The temperature of the water may be as high as 140° to 150° F., or more.

In the conventional steam evaporators which have been employed for many years in making fruit juice concentrates, the juice is caused to flow downwardly by gravity through a "bundle" of vertical tubes surrounded by steam. Great difficulty has been encountered, however, with such a steam evaporator, especially at higher densities, owing to the fact that the juice in contact with the hot walls of the tubes forms a film which adheres to such walls, and gradually builds up in thickness until, under certain conditions, the tubes become practically clogged with stiff, gummy material. In fact it is generally conceded by the industry that such an evaporator ceases to function after the density reaches 55° to 60° Brix.

I have discovered that by the use of a "swept surface" heater, such as described, I am able to carry the density to more than 72° Brix, without any difficulty. This is due to several factors. The rotating blades or scrapers sweep the inner surface of the heating cylinder clean at all times, so that there is no chance for a film to form or build up. The juice in the heater is under substantial hydraulic pressure, and is forced through by the pump at relatively high velocity. This results in a relatively low temperature differential between the inlet and outlet ports, so that there is not time enough for any portion of the juice to be adversely affected by the heat. To put it another way, the rapid flow and constant agitation result in all parts of the juice being heated with complete uniformity. I have also discovered that the operation of the scrapers produces a tremendous mechanical shearing action on the juice and particles of pulp, which keeps the mass broken up and also gives rise to a homogenizing effect.

It will be understood that, in producing my novel high density concentrate of 72° Brix and higher, I maintain such a high vacuum in the evaporation chamber that the water content of the juice flashes into vapor at a relatively low temperature. By using a larger and colder condenser 9, and thus increasing the rate of vapor flow from the evaporating chamber, I have been able to achieve evaporating temperature even lower than the 80° F. mentioned in my said patents. I have operated successfully with evaporation temperatures of from 58° to 64° F. Hence, actually, very little heating has to be done by the "swept surface" heater. The fresh juice is usually stored under a certain amount of refrigeration in hot weather. Thus if the incoming juice is, say, at a temperature of around 50° F. it would be necessary for the heater to raise the temperature only 8° to 12° to bring it to the evaporating temperature. These figures are, of course, only by way of example, and in no sense limitations.

It will be noted that, while as in my said prior patents the evaporating chamber 25 is connected by conduit 18 through condenser 9 to the intake 12 of a vacuum pump (not shown), in the present invention I provide a branch conduit 16 connecting the de-aerating chamber 4 with the conduit 18, so that the same vacuum pump serves to draw the vapors from the evaporating chamber and the air from the de-aerating chamber.

In operation, the juice from the "finisher" comes in through pipe 2 to the centrifuge. From this, the esters and the major portion of the pulp and pectin complexes are discharged from the pipe 2a, while the watery portion is delivered through pipe 3, as in my said prior patents. This watery portion, which includes most of the sugars and acids, contains sufficient pulp so that the completed 72° Brix concentrate, drawn off from the pipe 28, will have, when reconstituted, a pulp content of 5% to 13%.

I find it is best to use an .020 screen on the finisher, set loosely. This usually would allow too much pulp to pass through, so, to meet some specifications, a centrifuge is used to reduce the amount of pulp in the juice portion going to the evaporator.

In some cases, however, dependent on the variety of fruit, and other factors, I may use the .020 screen alone, without the centrifuge, feeding the whole juice directly from the finisher into pipe 3. This produces a concentrate that is commercially acceptable.

In FIG. 2 I have shown the same equipment as in FIG. 1, with corresponding parts similarly numbered. In FIG. 2, however, I have included an additional feature, namely, means for subjecting the juice to radio or other high frequency electrical energy before it enters the evaporating chamber. This electrical means may be similar to that illustrated in my said prior patents, and includes an electrode structure 37 and a high frequency generator 38, connected with the central electrode and casing by means of leads 38a and 38b.

While in my said prior patents, I do not disclose any heating means operating by thermal conduction, in the present invention I employ a heating device 19, similar to that shown and described in connection with FIGS. 1, 3, and 4, and cause the juice to circulate through this heating device and the electrode structure 37 in series.

It is usually desirable to heat the juice to some extent to bring it up to the evaporating temperature, and as explained in my said prior Pat No. 3,072,490, the means for applying high frequency electrical energy to the juice generates very little heat, its main function being to produce effects and changes which are of great importance but not fully understood. I therefore find that it is advantageous to heat the juice before it is subjected to the high frequency electrical energy. By way of example, but in no sense a limitation, I find that the temperature of the juice may advantageously be raised 6° to 8° F. as it passes through the heater 19, and the temperature of this heated juice may be raised 2° or 3° F. more as it passes through the electrical device 37. Thus the temperature differentials in both the heater 19 and electrical device 37 are very low.

I have discovered that the high frequency electrical energy seems to have a beneficial effect on the bacteria content of the juice. The plate count is lower when using high frequency energy as in my said patents and FIG. 2 of the present application than when not using any such energy as in FIG. 1 of the present application.

It will, of course, be understood that the juice flows in a solid stream under substantial hydraulic pressure through the electrode structure while being subjected to the high frequency electrical energy. In the arrangement shown in FIG. 2, the pressure in the heater 19 and electrode structure 27 is substantially the same, and may advantageously be as much as 40 pounds per square inch, or more.

With the above described equipment and method, I have produced juice concentrates of a density of 72° Brix, and higher, and of a viscosity of 4,000 to 10,000 centipoises at 75° F. These concentrates, having a pulp content of around 7%, can be stored indefinitely without deterioration at up to 30° F., and when stored at 0° F. do not gel. Moreover, when reconstituted by mixing with water, they show no tendency to separate.

It will be understood that satisfactory products of this character can be made with the equipment shown in either FIG. 1 or 2, that is to say, either with or without the high frequency electrical treatment. The use of the electrical energy, however, produces a concentrate of better flavor and stability, and of lower viscosity, as well as a lower bacteria count.

While I have described starting with fresh "single strength" juice, and running the concentrate up to 72° Brix in my improved equipment, I may follow an alternate two-step method. As above mentioned, it has been and is common practice to concentrate citrus juice up to 50° or 55° Brix by means of conventional steam evaporators. I can then take this 50° to 55° Brix concentrate from storage, and run the density up to 72° Brix or more by means of my apparatus. I have done this successfully. In this case a centrifuge may or may not be used, but the de-aerating chamber is especially advantageous in producing the final high density concentrate since the stored, low density concentrate often contains substantial quantities of air, and develops off flavors.

In FIG. 5 I have illustrated schematically an arrangement by which a conventional steam evaporator can be used for the purpose of accomplishing the preliminary concentration.

In this figure, 40 designates a heat exchanger comprising a "nest" or "bundle" of tubes, enclosed in a shell through which steam is caused to circulate by means of pipes 41. The juice flows through the tubes, which are surrounded by steam, and thus heated to a relatively high temperature, such as 85° to 90° F. The tubes are preferably of flattened cross section.

From the heat exchanger 40, the hot juice is discharged through pipe 42 into the lower part of an evaporating chamber or vapor separator 43, maintained under vacuum through pipe 18, as before, and as in my prior patents. The unvaporized residue flows downwardly through pipe 45, to pump 46, by which it is forced up through pipe 47 to the top of the heat exchanger.

In this arrangement I may or may not employ the "swept surface" heater, shown at 19, but it is of the utmost importance to include the high frequency electrode device 37, connected as shown. The fresh juice is drawn by pump 26a in through pipe 26b, and is forced under substantial hydraulic pressure up through pipe 27, into and through the heater 19 (if employed), and thence by pipe 23 into and through the high frequency electrode device 37. From this electrode device the fresh juice is discharged through pipe 39 and spray head 24 into the evaporating chamber 43. (The same reference characters as in FIGS. 1 and 2 are used in FIG. 5 to designate the corresponding parts, where present.) If the heater 19 is not used, the pump 26a would deliver direct to the electrode device through pipe 23.

The apparatus illustrated in FIG. 5 (other than the heater 19 and electrode device 37) constitute the first stage of a conventional steam evaporator. Pipe 48′, controlled by valve 48b, leads to the second stage (not shown) of the conventional steam evaporator, which operates in a similar manner.

The fresh juice coming into pump 26a is usually about 12° Brix. In the first stage of the steam evaporator, it is raised to a density of 20° to 22° Brix, while, when discharged from the second stage, it usually has a density of around 45° to 55° Brix. This preliminary concentration is effected at a relatively high temperature, above 80° F., such as 85° to 90° F., as above mentioned. To successfully raise the concentratton higher, say, to 72° Brix, it is necessary to use my improved method and apparatus as covered by my said patents, in which the juice never comes in contact with any surface hotter than 80° F.

When using the above described method, namely, first achieving a density of around 45° to 55° Brix in a conventional steam evaporator, at a relatively high temperature, and then raising the density to 72° Brix or more, by means of my patented low temperature method and apparatus, it is important to treat the incoming fresh juice with high frequnecy electrical energy, as shown in FIG. 5, before it reaches the evaporator. When using high frequency electrical energy in this way, the described two-step process yields a high density product which is commercially acceptable, while without subjecting the fresh fruit to this preliminary electrical treatment, I have found that the final high density concentrate is not of acceptable quality. This appears to be due to the observed fact that this preliminarly electrical treatment of the incoming fresh juice results in significantly lowering the viscosity of the concentrate.

In my said prior Pat. No. 3,072,490, I have explained how, by means of using high frequency electrical energy and low temperatures, I have been able to produce citrus concentrates of a density of 72° Brix or more, free from any caramelization, of low viscosity, and excellent taste and flavor, wthout the addition of fresh juice to the product as proposed by MacDowell in his Pat. No. 2,453,109. The same is true of the method and apparatus constituting the present invention. If, however, it is desired to still further improve the flavor of the product and to provide a high density concentrate of super-excellence and exceptionally fine taste, I may use the method shown in FIG. 6.

Figure 6:
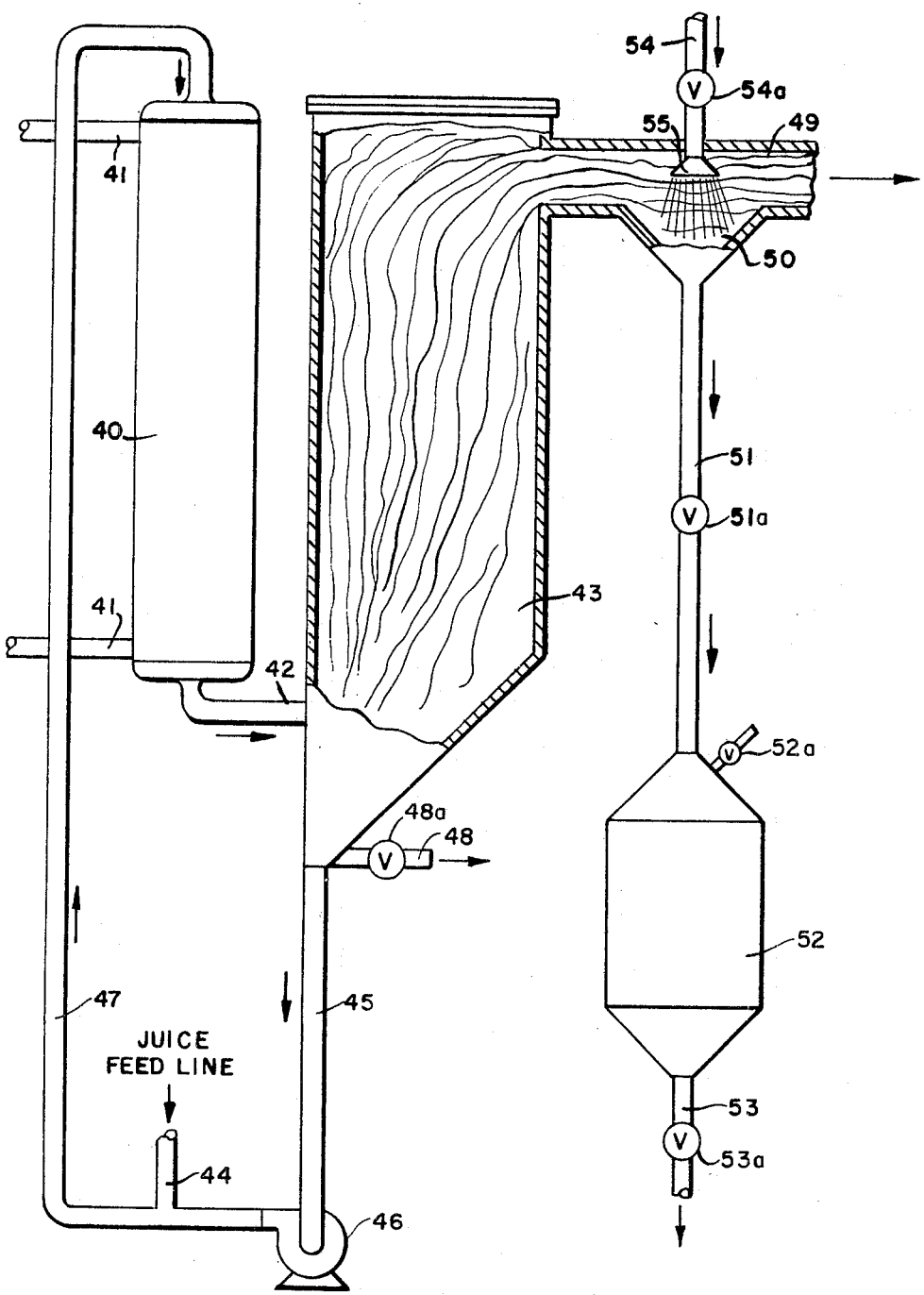
FIG. 6 is a view similar to FIG. 5, but showing my novel method of and apparatus for still further improving the flavor of my high density fruit juice concentrate.

As is well known, when fresh juice is treated in a conventional steam evaporator having several stages, most of the esters and flavoring ingredients are given off with the vapors coming from the first stage, in which the density is raised from 12° to about 22° Brix. In FIG. 6, I have illustrated how these esters and flavoring elements can be recaptured, condensed and absorbed into my high density concentrate.

Referring to FIG. 6 in detail, 40, as in FIG. 5, indicates a heat exchanger of the first stage of a steam evaporator, consisting of a shell-and-tube structure, preferably having flat tubes, heated by steam through pipes 41. From the bottom of this shell-and-tube type heater extends a pipe 42, delivering into a vapor chamber 43, connected by conduit 49 with a suitable vacuum pump (not shown). From the bottom of this chamber, also as in FIG. 5, extends a pipe 45 to a pump 46, which delivers the juice through a vertical pipe 47 into the upper end of the shell-and-tube heat exchanger 40. Fresh juice is fed in, preferably by means of a pump (not shown) through a pipe 44, tapping the pipe 47 at a point between the pump 46 and heat exchanger 40. The partially concentrated juice is drawn off to the second stage of the evaporator through pipe 48, controlled by valve 48a.

The heated water, esters and flavoring elements discharged from the pipe 42 pass, under the influence of the vacuum, into the chamber 43 in the form of vapors, and these are drawn by the vacuum pump through the conduit 49. The lower side of this conduit is formed with a hopper or funnel 50, and from this funnel extends a pipe 51 downwardly to a receptacle 52, provided with a vent 52a. The pipe 51 is controlled by a valve 51a, and from the bottom of the receptacle 52 extends a discharge pipe 53, controlled by a valve 53a.

A pipe 54, controlled by a valve 54a, enters the vapor conduit 49 vertically, immediately above the funnel 50, and terminates in the conduit in a spray head 55.

My improved concentrate, preferably of a density of 75° to 80° Brix, is fed in through the pipe 54, and is sprayed transversely across the conduit 49 into the funnel 50.

As will be understood, the vapors passing through the conduit 49 are relatively hot, say around 90° F., and the high density concentrate which is sprayed into them from the spray head is relatively cool, say around 55° to 60° F. This cold, high density spray therefore condenses and absorbs a substantial portion of the vapors, including the esters and flavoring elements, and its taste and flavor are improved accordingly. In the process, the concentrate is somewhat diluted, and its density reduced from the original 75° or 80° Brix to the standard 72° Brix, or whatever is desired.

In my said prior patents I have shown a pipe for introducing the fresh juice into the bottom of the evaporating chamber, while the finished concentrate is drawn off on the discharge side of the circulating pump. With such an arrangement, there is a possibility that a small amount of fresh juice may reach the outlet without being subjected to the high frequency electrical energy. Although this may be desirable in some instances, I can ensure against it by arranging the inlet and outlet as shown in FIG. 7. By reference to this diagram, it will be seen that I now introduce the juice through pipe 17 into the circulating line 27, 23 at a point in this line between the discharge side of the pump 26 and the electrical device, so that all of the juice must be subjected to the high frequency electrical energy before reaching the evaporating chamber, and that it is impossible for the fresh juice to escape from the outlet, which is located between the inlet and the discharge side of the pump.

While in the simplified diagram of FIG. 7 I have illustrated only the electrical device in the circulating line, the same as in my said patents, it will be understood that the same relative arrangement of inlet and outlet can be used where a heater only is employed, as in FIG. 1, or where both the heater and electrical device are used, as in FIG. 2. In fact, in FIG. 1 the inlet is located between the discharge side of the pump and the heater, while in FIG. 2 the arrangement is the same, so that the incoming juice passes first through the heater and then through the electrical device before entering the evaporating chamber. In either figure, it is impossible for any of the untreated juice to reach the outlet.

What I claim is:

1. Apparatus for evaporating water from liquid mixtures containing it, comprising in combination, a vertically disposed elongated vacuum chamber, means for creating a partial vacuum in said chamber, means for feeding into said chamber the liquid mixture to be concentrated, a conduit extending from the bottom of said chamber to a point near the top thereof, spray means at the upper end of said conduit, a pump in said conduit for circulating the liquid mixture from the bottom of said chamber to said spray means, means in said conduit for supplying heat to the liquid mixture, and additional means for applying high frequency electrical energy to the liquid mixture, said electrical energy applying means being included in said conduit at a point between said spray means and said heat supplying means.

2. Apparatus for evaporating water from liquid mixtures containing it, comprising in combination, a vertically disposed elongated vacuum chamber, means for creating a partial vacuum in said chamber, means for feeding into said chamber the liquid mixture to be concentrated, a high frequency dielectric heating unit, a separate additional heating means, and means for withdrawing the liquid mixture from the bottom of said chamber, circulating it up through said additional heating means and through said dielectric heating unit in series, and discharging it from the latter into said chamber at a point near the top thereof.

3. Apparatus for treating fruit juices comprising, in combination, a vertically disposed, elongated vacuum chamber, means for creating a partial vacuum in said chamber, a conduit extending from the bottom of said chamber to a point near the top thereof, spray means at the upper end of said conduit, a pump in said conduit for circulating the juices from the bottom of said chamber under pressure to said spray means, electrical means included in said conduit for causing high frequency electrical energy to be applied to said stream of juices as it flows through said conduit, and means for introducing the juices to be treated into said conduit at a point between the discharge side of said pump and said electrical means, whereby all incoming juices are forced to flow through said electrical means, 4. In an apparatus for evaporating water from fruit juices, the combination of evaporator means comprising means defining an upright evaporating chamber and including a liquid outlet at the bottom of said chamber, and means at the top of said chamber for placing said chamber in communication with an evacuating device to subject the interior of said chamber to reduced pressure, and discharge means in the upper portion of said chamber for discharging liquid into the chamber; pump means having an inlet and an outlet; a heater comprising liquid flow confining means having an inner surface of circular transverse cross section, said flow confining means being arranged to be heated externally and defining a heating chamber having an inlet and an outlet, and a rotor disposed in said heating chamber and mounted for rotation about an axis coaxial with said inner surface, said rotor comprising at least one longitudinally extending sweeping element disposed immediately adjacent said inner surface so as to sweep the same as said rotor is rotated; conduit means connecting said outlet of said evaporating chamber to said inlet of said pump; conduit means connecting said outlet of said pump to said inlet of said heater; and additional flow confining means connected between said outlet of said heating chamber and said discharge means in the upper portion of said evaporating chamber, said pump means being operative to cause a continuous flow of the liquid through said heater, and operation of said heater, while said rotor is rotated, causing the liquid to be heated and simultaneously agitated, with concurrent sweeping of said inner surface, in such fashion that all increments of the liquid delivered from said heater via said additional flow confining means to said discharge means of said evaporating chamber are at substantially the same temperature, such uniformity of temperature causing a corresponding uniformity of water removal from the liquid in said evaporating chamber, said additional flow confining means comprising means defining an additional treating chamber located adjacent said discharge means and so arranged that the liquid supplied from said heater passes through said additional treating chamber in a solid stream, and means at said additional treating chamber operative to subject the liquid flowing therethrough to high frequency electrical oscillations.

5. Apparatus for improving the flavor of high density fruit juice concentrate, comprising a conduit, means at one end of said conduit for causing esters and flavoring elements to be given off in the form of vapors from fresh juice, a vacuum pump connected with the other end of said conduit, whereby said vapors are caused to flow through said conduit, and means located intermediate the two ends of said conduit for bringing a spray of high density concentrate of substantially lower temperature into contact with said vapors.

6. Apparatus for improving the flavor of high density fruit juice concentrate comprising a conduit; means for supplying fresh juice; means at one end of said conduit for accepting said fresh juice and for causing esters and flavoring elements to be given off in the form of vapors from said fresh juice; a vacuum pump connected to the other end of said conduit to cause flow of said vapors through said conduit; means for providing high density juice concentrate to a point intermediate the two ends of said conduit at a temperature substantially lower than the temperature of the fresh juice vapors; and means for spraying said high density concentrate into contact with the vapors to condense said vapors into juice concentrate.

References Cited

UNITED STATES PATENTS

| 364,533 | 6/1887 | Maxwell | 261—118 XR |
| 1,711,614 | 5/1929 | Passelecq | 159—3 |
| 2,507,797 | 5/1950 | Martin | 99—205 XR |
| 2,625,505 | 1/1953 | Cross | 99—205 XR |
| 2,898,092 | 8/1959 | Miller et al. | |
| 2,903,372 | 9/1959 | Walker | 99—205 XR |
| 2,911,308 | 11/1959 | Smith et al. | 99—205 XR |
| 3,072,490 | 1/1963 | Sargeant | 99—205 |
| 3,113,063 | 12/1963 | Lanham. | |

ROBERT W. JENKINS, Primary Examiner

U.S. Cl. X.R.

99—205